March 29, 1955　　　E. G. DUERINGER　　　2,704,995
SELF-FEEDING STORAGE STRUCTURE
Filed Jan. 22, 1954　　　　　　　　　　　　　2 Sheets-Sheet 1

INVENTOR.
Erwin G. Dueringer
BY
Andrus & Scales
ATTORNEYS.

March 29, 1955　　E. G. DUERINGER　　2,704,995
SELF-FEEDING STORAGE STRUCTURE
Filed Jan. 22, 1954　　　　2 Sheets-Sheet 2

INVENTOR.
Erwin G. Dueringer
BY
Andrus & Scales
ATTORNEYS.

United States Patent Office 2,704,995
Patented Mar. 29, 1955

2,704,995

SELF-FEEDING STORAGE STRUCTURE

Erwin G. Dueringer, Milwaukee, Wis., assignor to A. O. Smith Corporation, Milwaukee, Wis., a corporation of New York Application January 22, 1954, Serial No. 405,609

5 Claims. (Cl. 119—52)

This invention relates to a self-feeding storage structure.

The present invention is directed to an apparatus for mechanically unloading silage or other feed material from a storage structure and distributing the same in a uniform manner around the periphery of the silo in position where it can be readily eaten by cattle or other animals.

According to the invention, a mechanical unloading device is disposed within the lower position of a storage structure containing silage or the like, and the unloading device serves to undercut or dislodge the silage and convey the same to the exterior of the structure.

An auger communicates with the unloading device and receives the silage discharged from the structure. The discharge end of the auger is restricted in cross-sectional area by a resilient member so that the silage being discharged from the auger will be compacted and issue from the auger in the form of an extruded plug.

An annular trough is rotatably disposed around the storage structure in position to receive the extruded plug of silage. The bottom of the trough is provided with a series of serrations which are engaged by the extruded plug of silage. The force exerted by the plug against the serrations serves to rotate the trough and distribute the silage around the periphery of the structure.

In the present invention the discharged silage itself is the driving force which serves to distribute the silage around the structure. In addition, the compacting of the silage at the discharge end of the auger limits the entry of air into the auger and into the structure and thereby reduces spoilage of the silage.

The drawings furnished herewith illustrate the best mode presently contemplated of carrying out the invention as set forth hereinafter.

Figure 1:
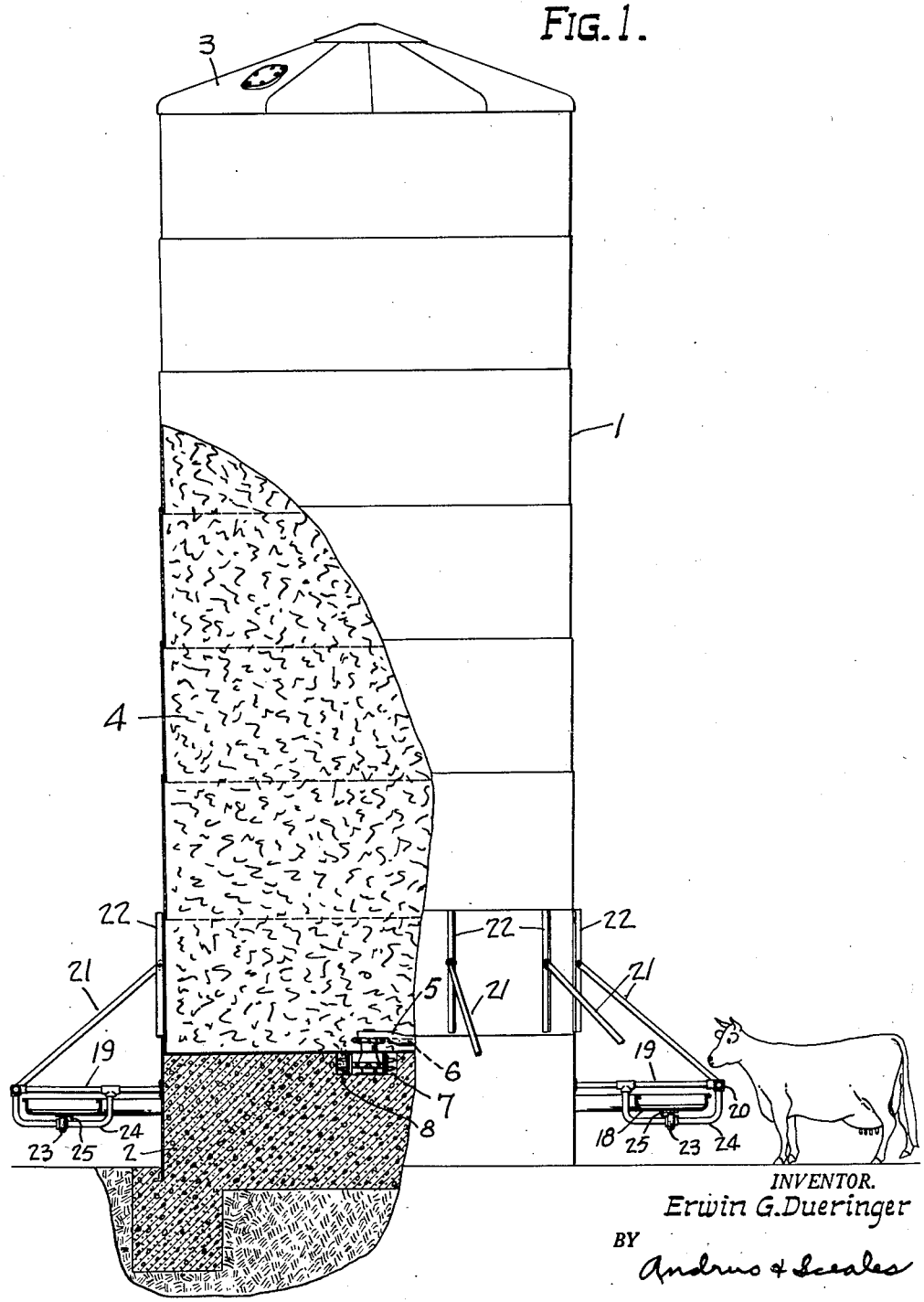
Figure 1 is a partial vertical sectional view of a storage structure embodying the present invention.
Figure 2:
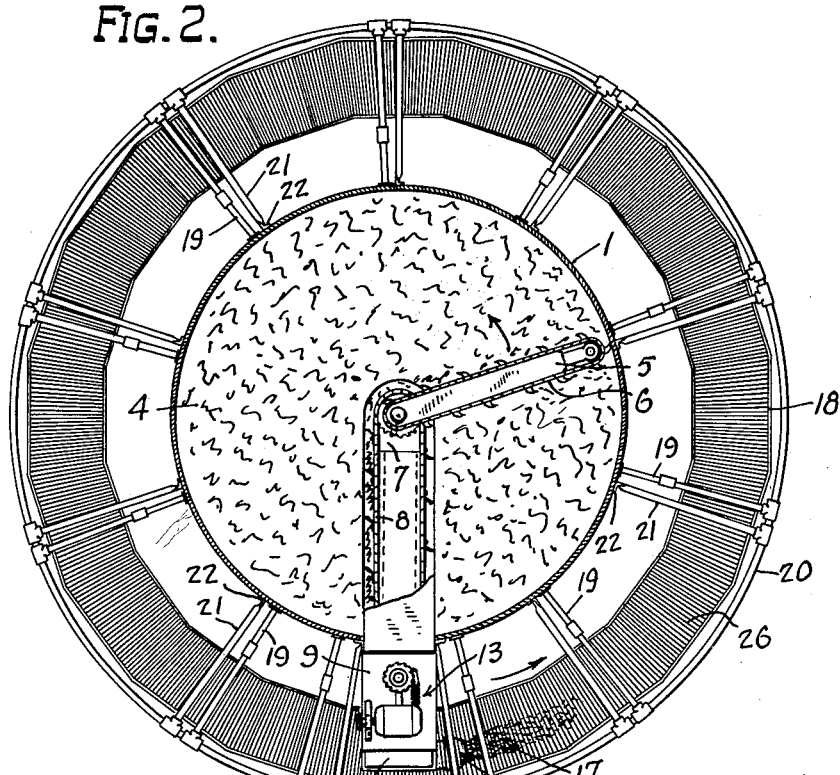
Fig. 2 is an enlarged transverse section of the storage structure of Figure 1.
Figure 3:
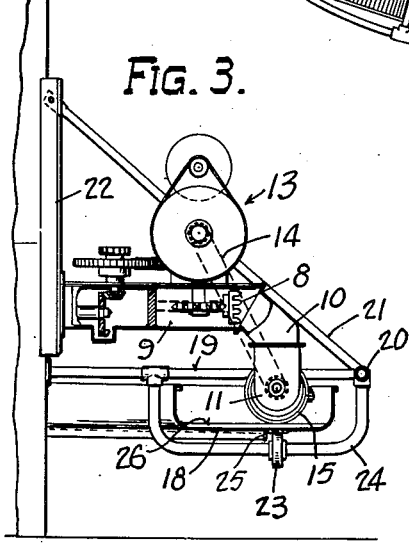
Fig. 3 is an enlarged side elevational view of the unloading mechanism, parts being shown in section.

There is shown in the drawings, a generally cylindrical storage structure 1 or silo which is supported on a foundation 2 and enclosed at the top by a roof 3.

The silo 1 is adapted to contain silage, grass or other feed materials 4. The silage is introduced into the silo 1 through a suitable inlet opening in the roof 3 and is removed from the bottom portion of the silo by a mechanical unloading unit.

The unloading unit comprises a cutter arm 5 which is rotatably secured to the foundation 2 at the center of the silo. The arm 5 is adapted to rotate above the upper surface of the foundation and carries an endless cutter chain 6 which travels around the arm and serves to undercut or dislodge the silage.

The dislodged silage is conducted by the cutter chain 6 to the center of the silo where it is discharged in a radially extending recess 7 formed in the upper surfaces of foundation 2. A conveying unit 8 is disposed within recess 7 and serves to convey the dislodged silage to the exterior of the silo.

An opening is provided in the wall of silo 1 which registers with the outer end of recess 7, and a generally box-shaped housing 9 is secured to the outer surface of the silo around the opening and communicates with the recess 7. The conveying unit 8 operates within the recess 7 and housing 9 to conduct the silage from the center of the silo to the outer end of the housing.

A downwardly extending elbow member 10 establishes communication between the outer end of housing 9 and an auger housing 11. A spiral-flight conveyor or auger 12 operates within auger housing 11 and silage introduced into the auger housing is conveyed by the auger to the exterior of the housing. The auger 12 extends generally transversely of the recess 7 and housing 9.

The auger 12 may be driven in any conventional manner. As shown in the drawings, a drive assembly 13, including a motor and reduction gear, is mounted on housing 9 and a drive belt 14 is connected between the output shaft of drive assembly 13 and the shaft of auger 12. In addition, the drive assembly 13 may also be employed to drive the conveyor unit 8 and the cutter arm 5.

To compact the silage being discharged from the auger housing 12 and thereby restrict the entry of air into the housing 12 and the silo 1, one end of a resilient tube 15 is stretched over the discharge end of housing 12.

Figure 4:
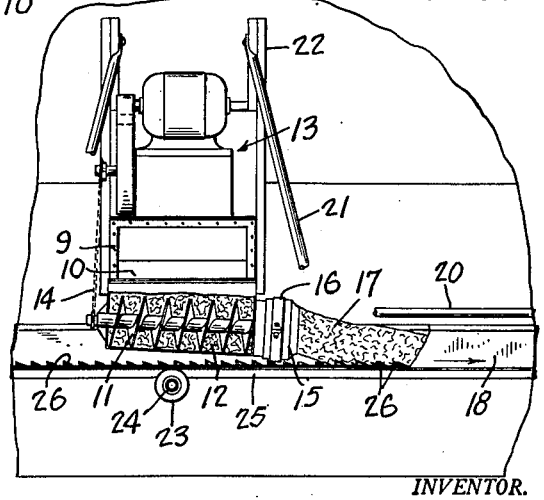
Fig. 4 is an end elevational view of the mechanism shown in Fig. 3, parts being shown in section.

Tube 15 is retained in place on housing 12 by a split ring 16 or the like. The outer portion of tube 15, not being stretched, provides a decreased diameter for the discharge of the silage and thereby causes the silage to be compacted and issue from the auger housing in the form of an extruded plug, as indicated by 17 in Fig. 4.

By this construction the silage being discharged from auger 12 is forced to conform to the restricted diameter of the unstretched outer portion of the tube and thus is compacted. The compacted silage has a greater density and limits the entry of air into the housing 12 and silo 1 and thereby substantially reduces the danger of spoilage.

The silage extruded from auger 12 is discharged into a rotatable annular trough 18 which is disposed outwardly of the silo 1 in a plane beneath the auger.

The trough 18 is supported and protected from damage by a tubular frame which extends outwardly from the silo.

The frame comprises a plurality of horizontal braces 19 which extend radially outwardly from the silo and are connected together at their outer ends by a ring 20.

Additional support and rigidity is given to the frame by a plurality of circumferentially spaced diagonal supports 21. The inner end of each support 21 is attached to a vertical rib 22 which is secured to the outer surface of the silo while the outer end of each support 21 is connected to ring 20.

The trough 18 is disposed on a series of circumferentially spaced rollers 23, each of which is rotatably secured to a generally U-shaped brace 24. Braces 24 are secured to and extend downwardly from the corresponding horizontal braces 19.

The rollers 23 ride on an angle guide rail 25 secured to the bottom surface of trough 18. The depending flange of rail 25 serves to prevent radial displacement of the trough with respect to the silo.

The framework described functions to support trough 18 and also prevents cattle or other animals being fed from being against the trough and damaging or preventing rotation of the same.

The trough 18 is rotated about the silo by the action of the extruded plug of silage 17 discharged from auger 12 on a series of transverse serrations 26 formed on the bottom surface of the trough 18. The extruded silage 17 exerts a force against the serrations 26 which serves to push or rotate the trough in the direction that the silage is being discharged from the auger.

With this construction, the silage is distributed about the entire periphery of the silo or any portion of the periphery in a position where the cattle can readily have access to the same.

The present structure provides a means of automatically distributing silage around the periphery of the silo by the force exerted by the compacted plug of silage being discharged from the auger. In addition, the compacted nature of the extruded plug tends to prevent air from entering the silo and thereby substantially reduces the danger of spoilage of the silage which normally occurs if air is permitted to contact the same.

Various modes of carrying out the invention are contemplated as within the scope of the following claims particularly pointing out and distinctly claiming the subject matter which is regarded as the invention.

I claim:

1. In a storage structure for containing silage or the like and having an unloading unit disposed within the bottom portion of the structure for dislodging the silage and conveying the same to the exterior of the structure, an auger communicating with the unloading unit to receive the silage discharged from the structure, means associated with the discharge end of the auger for resiliently restricting the cross-sectional area of said discharge end and compacting the silage being discharged from said auger into the form of an extruded plug, a trough rotatably disposed around the structure in position to receive the plug of silage discharged from said auger, and means projecting upwardly from the bottom of said trough to be engaged by said plug with the force exerted by said plug acting against said last named means in a direction to rotate the trough and distribute the silage about the structure.

2. In a silo for containing sliage or the like and having an unloading unit disposed within the bottom portion of the silo for dislodging the silage and conveying the same to the exterior of the silo, an auger communicating with the unloading unit to receive the silage discharged from the silo, means associated with the discharge end of the auger for resiliently restricting the cross-sectional area of said discharge end and compacting the silage being discharged from said auger into the form of an extruded plug, a trough rotatably disposed around the silo in position to receive the plug of silage discharged from said auger, said trough being provided with a series of generally radially extending ridges and grooves adapted to be engaged by said plug with the force exerted by said plug acting generally normally against said ridges and grooves to rotate the trough and distribute the silage about the silo, and a frame secured to the silo and extending outwardly of the trough to rotatably support the trough and protect the same from damage.

3. In a storage structure for containing silage or the like and having an unloading unit disposed within the bottom portion of the structure for dislodging the silage and conveying the same to the exterior of the structure, an auger communicating with the unloading unit to receive the silage discharged from the structure, means associated with the discharge end of the auger for resiliently restricting the cross-sectional area of said discharge end and compacting the silage being discharged from said auger into the form of an extruded plug, an annular trough rotatably disposed around the structure in position to receive the plug of silage discharged from said auger with the axis of said auger being disposed generally tangentially to the periphery of the trough, and a plurality of serrations on the bottom surface of the trough and disposed substantially normally to the direction of discharge of the silage from the auger in position to be engaged by the plug of silage with the force exerted by said plug acting to rotate the trough and distribute the silage around the periphery of the structure.

4. In a storage structure for containing silage or the like and having an unloading unit disposed within the bottom portion of the structure for dislodging the silage and conveying the same to the exterior of the structure, an auger disposed adjacent the outer surface of said structure and communicating with the unloading unit to receive the silage discharged from the structure, a resilient tube provided around the discharge end of said auger and projecting outwardly therefrom with the outer end of said tube defining a restricted opening of lesser cross-sectional area than said auger, the outer end of said tube serving to compact the silage being discharged from the auger into the form of an extruded plug restricting the entry of air into said auger and into said structure and thereby reducing the spoilage of the silage, a frame connected to the outer surface of the structure and extending outwardly therefrom, a plurality of circumferentially spaced rollers rotatably secured to said frame, an annular trough disposed around the structure and rotatably mounted on said rollers to receive the plug of silage discharged from said auger, and means projecting upwardly from the bottom of said trough and engaged by said plug with the force exerted by the plugs acting against said means in a direction to rotate the trough and distribute the silage about the outside of the structure.

5. In a storage structure supported by a foundation and adapted to contain silage, a cutter arm rotatably disposed within the bottom portion of the structure and adapted to rotate in a plane above the foundation to undercut and dislodge the silage, a recess formed in the upper surface of the foundation and extending radially from the center of the structure to the exterior thereof, a housing secured to the outer surface of the structure and disposed in communication with said recess, conveyor means disposed within the recess and the housing to convey the dislodged silage to the exterior of the silo, an auger communicating with the housing to receive silage discharge from said conveyor means, said auger extending substantially normally to the longitudinal center line of said recess and said housing, means associated with the discharge end of the auger for resiliently restricting the cross-sectional area of said discharge end to compact the silage being discharged from said auger into the form of an extruded plug, an annular trough rotatably disposed around the structure in position to receive the plug of silage discharged from said auger, and means projecting upwardly from the bottom of said trough and engaged by said plug with the force exerted by the plug acting against said last-named means in a direction to rotate the trough and distribute the silage about the outside of the structure.

No references cited.